United States Patent [19]

Wu

[11] Patent Number: 4,649,586
[45] Date of Patent: Mar. 17, 1987

[54] SOLE FOR ATHLETIC SHOE AND METHOD OF MAKING THE SAME

[76] Inventor: Chuck Wu, No. 26, Meiting St., Taichung, Taiwan

[21] Appl. No.: 796,852

[22] Filed: Nov. 12, 1985

[51] Int. Cl.$^4$ .................. A43B 13/12; B32B 5/06
[52] U.S. Cl. .................. 12/146 B; 36/30 R; 36/44; 428/235
[58] Field of Search ......... 36/44, 30 R; 12/146 B; 28/109, 143; 428/235

[56] References Cited

U.S. PATENT DOCUMENTS

| | | | |
|---|---|---|---|
| 2,333,303 | 11/1943 | Enos | 36/25 R |
| 2,766,158 | 10/1956 | Rinecker | 36/30 R |
| 3,554,852 | 1/1971 | Sugarman et al. | 428/235 |
| 4,048,368 | 9/1977 | Hale et al. | 428/235 |
| 4,192,086 | 3/1980 | Sichak | 36/44 |
| 4,235,027 | 11/1980 | Singh | 36/44 |
| 4,338,369 | 7/1982 | Foenard | 428/235 |
| 4,418,104 | 11/1983 | Kiyomura et al. | 28/109 |
| 4,461,099 | 7/1984 | Bailly | 36/44 |
| 4,464,850 | 8/1984 | Ebert et al. | 36/44 |
| 4,504,538 | 3/1985 | Mussallem, Jr. | 428/235 |
| 4,529,644 | 7/1985 | Awano et al. | 428/235 |

Primary Examiner—Henry S. Jaudon
Assistant Examiner—Steven N. Meyers
Attorney, Agent, or Firm—Jeffers, Irish & Hoffman

[57] ABSTRACT

A midsole for an athletic shoe made by a process comprising, forming a plastic board using a composition containing polyethylene resin, polypropylene resin, polyester fiber, acrylic fiber, nylon fiber and cotton fiber, overlaying at least one layer of woven fabric on said plastic board, and punching needle holes at intervals in the full area of the superposed board and fabric layer, whereby the fibers in the board and the fabric layer are interlinked binding the board and the fabric layer, and vents are formed in the bonded board and the fabric layer.

2 Claims, 1 Drawing Figure

SOLE FOR ATHLETIC SHOE AND METHOD OF MAKING THE SAME

BACKGROUND OF THE INVENTION

This invention relates to a method of making a shoe sole, and particularly to a method of making a midsole for an athletic shoe.

Hitherto, midsoles of athletic shoes were made of materials, such as those sold under the trade marks of Texon and Bontex. Such materials are of poor flexibility and strength, and are susceptable to becoming deformed and wearing when subjected to frequent movement of the user's foot. In addition, they have low resistance to washing and cannot provide a comfortable feel as well as a ventilatory effect for the user.

SUMMARY OF THE INVENTION

An object of the invention is to provide an athletic shoe with a midsole of good ventilation, good flexibility, high tensile strength, high tear strength and high bending strength.

Another object of the invention is to provide a method of making a midsole for an athletic shoe having the above-described characteristics.

These and other objects can be achieved in accordance with the present invention through the provision of an improved midsole which is made by a method comprising: forming a plastic board using a composition containing polyethylene resin, polypropylene resin, polyester fiber, acrylic fiber, nylon fiber and cotton fibers; overlaying at least one layer of woven fabric on said plastic board; and punching needle holes at intervals in the full area of the plastic board and the woven fabric, whereby the fibers in the board and the fabric are interlinked, binding the board and the fabric, and vents are formed in the bonded board and fabric. The resulting combination forms a midsole which has a resistance to washing and possesses high tensile strength, high tear strength, high bending strength, good flexibility and good ventilation. The woven fabric may be made of fibers selected from polypropylene fibers and polyethylene fibers.

In accordance with one aspect of the invention, the method may include the steps of applying on said woven fabric layer a coating selected from polyethylene coating and polypropylene coating, and calendaring the boards and the fabric layer to cause the coating to penetrate into the fabric layer.

The present exemplary preferred embodiment will be described in detail with reference to the following drawings, in which:

DETAILED DESCRIPTION OF THE PREFERRED EMBODIMENT

Figure 1:
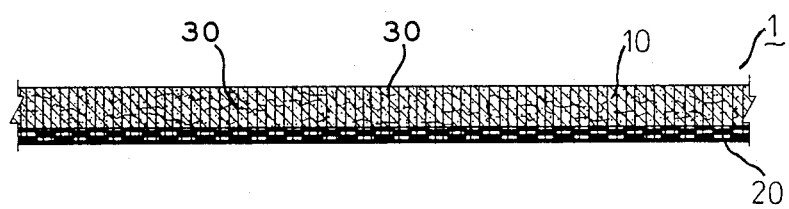
FIG. 1 is a sectional view of a midsole embodying the present invention.

Referring to the drawing, there is shown a midsole 1 which includes a molded plastic board 10 and a layer of resin coated woven fabric 20 which is bonded to the board 10. The board 10 is made by using a composition which consists of polyethylene resin, polypropylene resin, polyester fiber, acrylic fiber, nylon fiber and cotton fiber. The woven fabric of layer 20 is made of a synthetic fiber which may be either polyethylene fiber or polypropylene fiber.

Two woven fabric sheets which are not coated are firstly superimposed on one side of the board 10, and in the full area of the superposed board 10 and the laminated fabric sheets are punched a number of needle holes 30 at intervals, preferably 6000 needle holes per sq.m (the needle holes are not shown in the drawing). This can be accomplished by any way known by those skilled in the art. This process causes the fibers in the board 10 and fabric sheets to interlink, binding the board 10 and the fabric sheets together and forming vents in the bonded board 10 and the fabric sheets.

A coating which is made of polyethylene resin or polypropylene resin is further applied on the fabric sheets. After the coating is applied on the fabric sheets, the combined board 10 and fabric sheets are compressed at a suitable temperature to cause the coating to penetrate into the fabric sheets, thereby forming a resin coated woven fabric layer 20. The midsole 1 formed thereby has high tensile strength, high tear strength, high bending strength, good ventilation, and possesses a good resistance to washing.

When the midsole 1 is used, the layer 20 can be bonded to an outsole of a shoe and the board 10 can be bonded to an insole. The board 10 can be of any desired thickness. Alternatively, the board 10 can also be bonded to an outsole directly.

With the invention thus explained, it is apparent that various modifications and variations can be made without departing from the scope of the invention. It is apparent that the invention be limited as indicated in the appended claims.

What I claim is:

1. A method of making a midsole for a shoe comprising:
    forming a plastic board using a composition containing polyethylene resin, polypropylene resin, polyester fiber, acrylic fiber, nylon fiber and cotton fiber;
    overlaying at least one layer of woven fabric on said plastic board;
    punching needle holes at intervals in the full area of the superposed board and fabric layer, whereby the fibers in the board and the fabric layer are interlinked thereby binding the board and the fabric layer and forming vents in the bonded board and the fabric layer; and
    applying on said woven fabric layer a coating selected from polyethylene coating and polypropylene coating, and compressing the boards and the fabric layer to cause the coating to penetrate into the fabric layer.

2. A method as claimed in claim 1, wherein said woven fabric is made of fibers selected from polypropylene fibers and polyethylene fibers.

* * * * *